US008565546B2

(12) United States Patent
Coupe et al.

(10) Patent No.: US 8,565,546 B2
(45) Date of Patent: Oct. 22, 2013

(54) IMAGE DENOISING DEVICE

(75) Inventors: Pierrick Coupe, Rennes (FR); Christian Barillot, Laille (FR); Pierre Hellier, Thorigne Fouillard (FR); Charles Kervrann, La Chapelle des Fougeretz (FR)

(73) Assignees: Inria Institut National de Recherche en Informatique et en Automatique, Le Chesnay (FR); Centre National de la Recherche Scientifique, Paris Cedex (FR); Institut National de Recherche en Agronomie, Paris Cedex (FR); Universite de Rennes, Rennes Cedex (FR)

( * ) Notice: Subject to any disclaimer, the term of this patent is extended or adjusted under 35 U.S.C. 154(b) by 359 days.

(21) Appl. No.: 12/988,794

(22) PCT Filed: Apr. 16, 2009

(86) PCT No.: PCT/FR2009/000445
§ 371 (c)(1),
(2), (4) Date: Nov. 9, 2010

(87) PCT Pub. No.: WO2009/133307
PCT Pub. Date: Nov. 5, 2009

(65) Prior Publication Data
US 2011/0044553 A1    Feb. 24, 2011

(30) Foreign Application Priority Data

Apr. 21, 2008  (FR) ...................................... 08 02206

(51) Int. Cl.
*G06K 9/00* (2006.01)
(52) U.S. Cl.
USPC .......................................... 382/261; 382/205
(58) Field of Classification Search
None
See application file for complete search history.

(56) References Cited

U.S. PATENT DOCUMENTS 8,139,650 B2 *  3/2012  Cunha et al. ............. 375/240.29
2010/0272340 A1 * 10/2010  Bar-Aviv et al. ............. 382/131
(Continued)

FOREIGN PATENT DOCUMENTS

EP         1 367 536 A1   12/2003
WO    WO 2005/122086 A2   12/2005

OTHER PUBLICATIONS

Buades et al. (Jun. 2005) "A non-local algorithm for image denoising." Proc. 2005 IEEE Comp. Sci. Conf. on Computer Vision and Pattern Recognition, vol. 2 pp. 60-65.*

(Continued)

*Primary Examiner* — Barry Drennan
(74) *Attorney, Agent, or Firm* — Christie, Parker & Hale, LLP

(57) ABSTRACT

An image processing device comprises a store (110) for receiving image data (8) with a pixel identifier and at least one piece of associated intensity data and a pilot (100) which is provided to call a reduction unit (120) with pixels to be weighted and, for each pixel, in order to define a first neighborhood and a plurality of second neighborhoods with a neighborhood selection unit (130), in order to obtain a weighting value for the second neighborhood with a weighting unit (140) with the first neighborhood and a neighborhood among the plurality of second neighborhoods, in order to define each time a piece of weighted intensity data of a working pixel as the weighting value of the second neighborhood multiplied by the intensity data of the associated working pixel, and in order to define a piece of weighted intensity data of the pixel to be weighted by adding each of the pieces of weighted intensity data of a working pixel. The weighting unit (140) is provided to calculate the distance between first and second neighborhoods on the basis of a sum, where each square of the difference between the respective intensity data of these neighborhoods is modulated by a quantity which is inversely proportional to the intensity data in the second neighborhood.

4 Claims, 5 Drawing Sheets

(56) References Cited

U.S. PATENT DOCUMENTS

| | | | |
|---|---|---|---|
| 2011/0019935 A1* | 1/2011 | Kelm et al. | 382/275 |
| 2011/0222756 A1* | 9/2011 | Yea et al. | 382/154 |
| 2011/0311154 A1* | 12/2011 | Vandame | 382/263 |
| 2012/0182388 A1* | 7/2012 | Lim et al. | 348/43 |
| 2012/0224784 A1* | 9/2012 | Cohen et al. | 382/260 |

OTHER PUBLICATIONS

Coupe et al. (May 2008) "Bayesian non-local means-based speckle filtering." $5^{th}$ IEEE Int'l Symp. on Biomedical Imaging: From Nano to Micro, pp. 1291-1294.*

Kervrann et al: "Bayesian Non-local Means Filter, Image Redundancy and Adaptive Dictionaries for Noise Removal," Scale Space and Variational Methods in Computer Vision; [Lecture Notes in Computer Science; ;LNCS], Springer-Verlag Berlin Heidelberg, vol. 4485, (May 30, 2007), pp. 520-532.

Coupe et al: "An Optimized Blockwise Nonlocal Means Denoising Filter for 3-D Magnetic Resonance Images," IEEE Transactions on Medical Imaging, IEEE Service Center, Piscataway, NJ, US, vol. 27, No. 4, (Apr. 1, 2008), pp. 425-441.

Buades et al: "A Review of Image Denoising Algorithms, With a New One," Multiscale Modeling & Simulation, Society for Industrial and Applied Mathematics, US, vol. 4, No. 2, (Jul. 18, 2005), pp. 490-530.

Loupas, T. et al.; "An Adaptive Weighted Median Filter for Speckle Suppression in Medical Ultrasonic Images"; IEEE Transactions on Circuits and Systems; vol. 36; No. 1; Jan. 1989; pp. 129-135.

* cited by examiner

IMAGE DENOISING DEVICE

CROSS-REFERENCE TO RELATED APPLICATION(S)

This application is a National Phase Patent Application and claims the priority of International Application Number PCT/FR2009/000445, filed on Apr. 16, 2009, which claims priority of French Patent Application Number 0802206, filed on Apr. 21, 2008.

The invention relates to a device for processing images in order to enhance an image, for example, an image acquired with an imaging device.

Nowadays, an imaging operation conventionally comprises a step of acquiring image data and a step of displaying the image acquired.

In accordance with the imaging method selected (for example, ultrasound, MRI, X-rays, etc.) and the type of equipment used for the acquisition of the image, the image acquired has a quality which is more or less suitable for use by being displayed.

In the specific case of ultrasound imaging, a particularly disruptive noise component is the noise referred to as "speckles". That type of noise is particularly disruptive.

It is extremely difficult to reduce, is of a type which is difficult to model, and requires consistent calculation means in order to obtain satisfactory results. All those problems make a noise reduction operation allowing display in real time difficult.

Noise reduction solutions have been developed but their effectiveness is inadequate.

An object of the invention is to improve the situation.

To that end, the invention proposes an image processing device comprising:

- a store for receiving image data, each one comprising a pixel identifier and at least one piece of associated intensity data,
- a reduction unit which is capable of selecting working pixels (Vi) around a given pixel on the basis of a reduction rule,
- a neighbourhood selection unit which is capable of selecting a neighbourhood (Ni) of a given pixel on the basis of a neighbourhood rule,
- a weighting unit which is capable of calculating a weighting value between two neighbourhoods on the basis of distances between the intensity data in those neighbourhoods and
- a pilot which is provided to call the reduction unit with pixels to be weighted and which is provided, for each pixel to be weighted, in order to:
- call the selection unit, on the one hand, with the pixel to be weighted in order to define a first neighbourhood and, on the other hand, with the associated working pixels in order to define a plurality of second neighbourhoods,
- repeatedly call the weighting unit with the first neighbourhood and a neighbourhood from the plurality of second neighbourhoods in order to obtain each time a weighting value for the second neighbourhood,
- multiply each weighting value of the second neighbourhood by the intensity data of the associated working pixel in order to define each time a piece of weighted intensity data of a working pixel and
- define a piece of weighted intensity data of the pixel to be weighted by adding each of the pieces of weighted intensity data of a working pixel.

The weighting unit is provided to calculate the distance between first and second neighbourhoods on the basis of the sum of the squares of the difference between the respective intensity data of these neighbourhoods, each square being modulated by a quantity which is inversely proportional to the intensity data in the second neighbourhood.

Such a device is advantageous because it allows extremely effective noise reduction to be carried out whilst having reasonable calculation costs.

Other features and advantages of the invention will be better appreciated from a reading of the following description which is taken from examples which are given by way of non-limiting illustration with reference to the drawings, in which.

Figure 3:
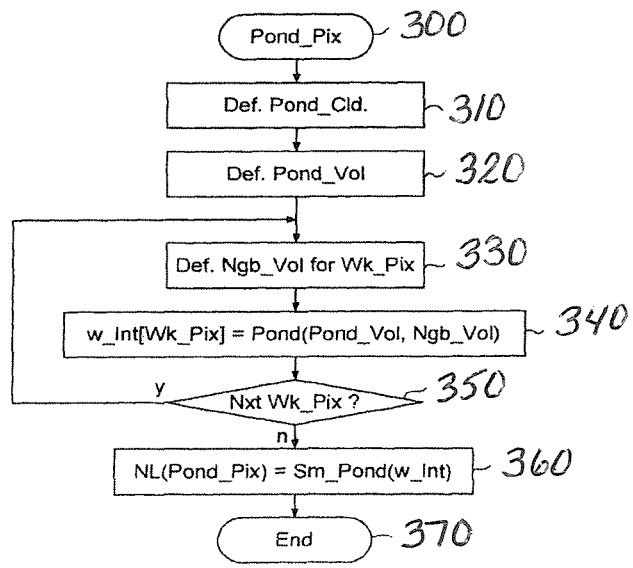
FIG. 3 illustrates a first exemplary embodiment of a step of FIG. 2.
Figure 8:
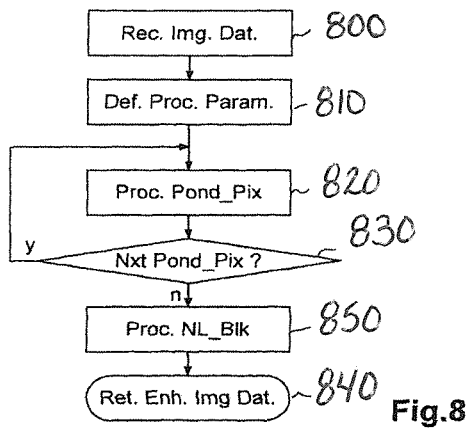

FIG. 8 describes a variant of FIG. 3; and

Figure 9:
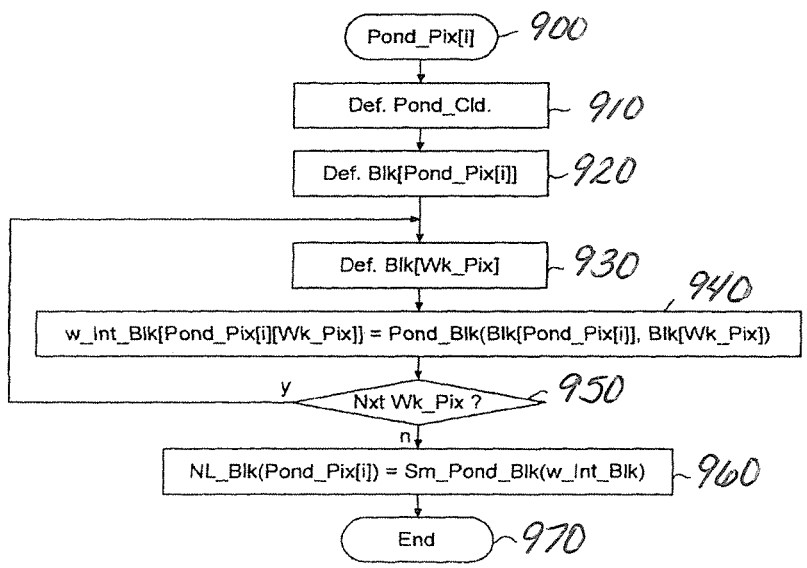
Figure 10:
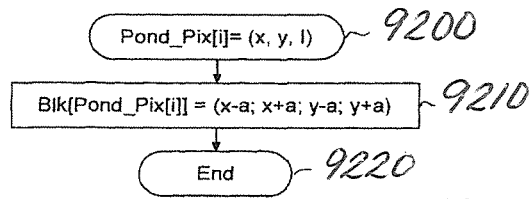
Figure 11:
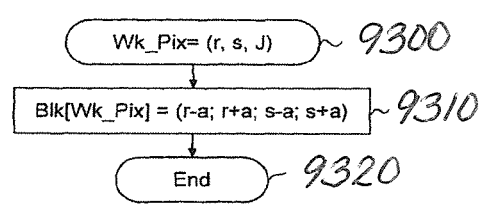

FIGS. 9 to 11 illustrate specific implementations of operations of FIG. 8.

The drawings and the description below substantially contain elements of a definitive nature. Therefore, they will be able not only to serve to better explain the present invention, but also to contribute to the definition thereof, where applicable.

The present description relates to the introduction of elements which are capable of protection by copyright. The owner of the rights does not object to identical reproduction by anyone of the present patent document or its description as it appears in official files. Otherwise, the owner reserves all rights.

The detailed description is further supplemented by annex A which sets out the formulation of some mathematical formulae implemented in the context of the invention. That annex is separate for the sake of clarity and in order to facilitate references. It is an integral part of the description and will therefore be able not only to serve to better explain the present invention but also to contribute to its definition, where applicable.

Figure 1:
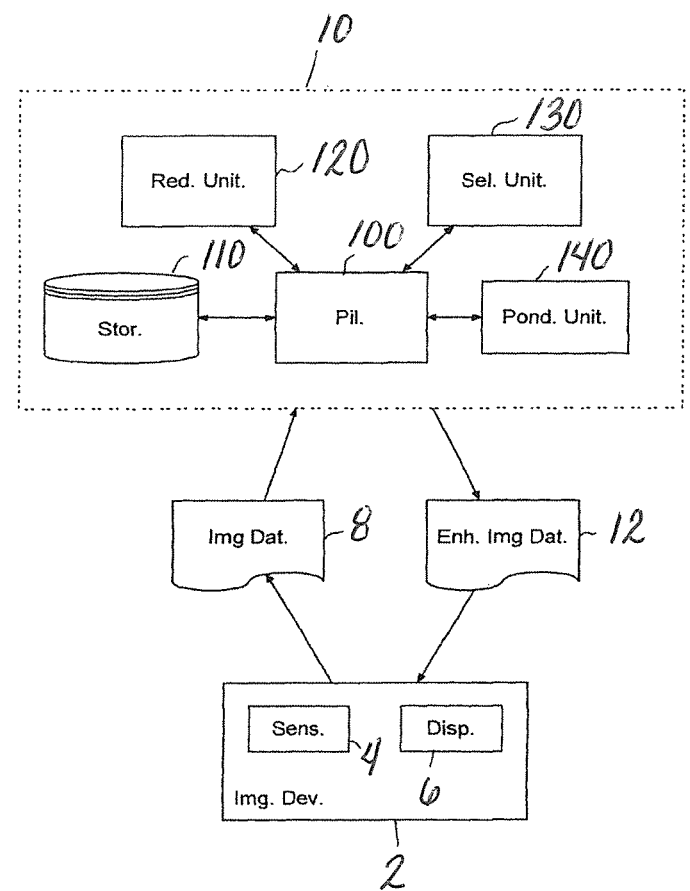
FIG. 1 is a schematic view of a device according to the invention.

FIG. 1 is a schematic view of a device for processing images according to the invention in co-operation with an imaging device.

An imaging device 2 comprises a sensor 4 and a display unit 6.

After an image has been acquired by the sensor 4, unprocessed image data 8 are transmitted to the image processing device 10. The image processing device 10 processes the unprocessed image data 8 and returns enhanced or noise-reduced image data 12 for display by the display unit 6.

The device 10 comprises a pilot 100 which controls a store 110, a reduction unit 120, a selection unit 130 and a weighting unit 140 in order to convert the unprocessed image data 8 into enhanced image data 12.

Generally, the unprocessed image data 8 and the enhanced image data 12 may be considered to be a set of n-tuples comprising for each pixel of the image:

coordinates of the pixel involved in the image and
intensity data which are associated with that pixel.

The invention is used in images having two dimensions, three dimensions or more.

Consequently, the pixel coordinates of an image can be represented by an n-tuple, where n is the spatial dimension involved (that is to say, 2 for a planar image, 3 for an image in three dimensions, etc.).

With regard to the intensity data of the pixels, the invention relates to all types of display, whether in colour or in gradations of grey.

Consequently, the intensity data can be represented by a number which designates a gradation value in the case of an image with grey gradations or can be an n-tuple, for example, a triple of RGB values in the case of colour imaging.

Although the device 10 has been illustrated in FIG. 1 as being external with respect to the imaging device 2, it must further be understood that the device 10 may equally well be integrated inside the imaging device 2 or outside it.

The purpose and the functions of the reduction unit 120, the selection unit 130 and the weighting unit 140 will be better appreciated from a reading of the remainder of the description.

Figure 2:
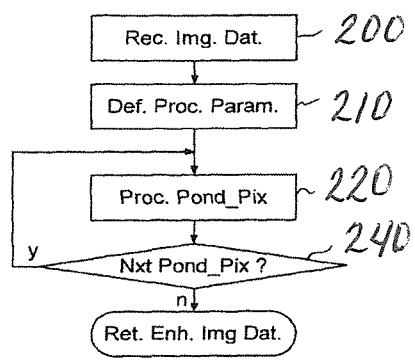
FIG. 2 is a flow chart illustrating the main steps of an operation for processing images according to the invention.

FIG. 2 is a high-level flow chart of the processing of the unprocessed image data 8 by the image processing device 10.

The unprocessed image data 8 are first received in an operation 200 and stored in the store 110.

Subsequently, in an operation 210, processing parameters are input. Those parameters and their influence on the image processing will be better appreciated from a reading of the remainder of the description.

It will be appreciated that the operation 210 is optional and that it is, for example, possible to fix the processing parameters before any image acquisition.

There is subsequently launched a loop, in which the pixels of the image data received at 200 are successively processed in an operation 220 in order to noise-reduce the image and to produce the enhanced image data 12.

An operation 230 brings about a change to a following pixel in the unprocessed image data 8 or transmits the enhanced image data 12 in an operation 240 when all the pixels of the image data received have been processed.

FIG. 3 illustrates a first embodiment of the operation 220.

This operation starts at 300 from a current image pixel to be processed Pond_Pix. In this instance, the term Pond_Pix refers to the notion of pixels. This is because, in the example described, the image being processed is two-dimensional. For images having more dimensions, for example, three-dimensional images, the term Pond_Pix would be used to refer to a voxel.

The result of operation 200 will be an image pixel in the enhanced image data 12 which has, on the one hand, the coordinates of the pixel Pond_Pix and, on the other hand, noise-reduced intensity data.

In an operation 310, the pilot 100 calls the reduction unit 120 in order to select working pixels around the point Pond_Pix In an operation 320, the pilot 100 subsequently calls the neighbourhood selection unit 130 in order to define a neighbourhood of pixels around the pixel Pond_Pix among the working pixels selected in operation 310.

There is subsequently launched a weighting loop in which the working pixels selected in operation 310 are successively used as current working pixels Wk_Pix in order to establish weighting values of the intensity of the pixel Pond_Pix.

In this instance, the pixel Pond_Pix is the pixel which is weighted in the main loop (operations 220 and 230) and the pixel Wk_Pix is qualified as the working pixel because it is the one which varies in the secondary loop (operations 330 to 350).

This loop begins at 330 with the neighbourhood selection unit 130 being called by the pilot 100 in order to select a neighbourhood of pixels around the current working pixel Wk_Pix.

In an operation 340, a function Pond( ) is carried out in order to determine a weighting value between the neighbourhood of the pixel Pond_Pix and the neighbourhood of the working pixel Wk_Pix.

The result of that weighting is stored in a table w_Int[ ] in accordance with an identifier of the working pixel Wk_Pix.

Finally, in an operation 350, a test verifies whether the set of working pixels selected in the operation 310 have been scanned.

If that is the case, operation 220 continues by calculating a weighted intensity for the pixel Pond_Pix at 360 on the basis of the table w_Int[ ] and the intensities of the pixels Wk_Pix.

Subsequently, the operation 30 terminates at 370 and the enhanced image data 12 are transmitted to the imaging device 2 for display by the display unit 6.

Otherwise, the weighting loop is reiterated with a new working pixel Wk_Pix at 330.

The function Pond( ) is based on weighting of the "non-local means" type that is adapted to an empirical speckle noise model set out in "*An adaptive weighted median filter for speckle suppression in medical ultrasound image*", IEEE T. Circ. Syst., 36:129-135, 1989 by Loupas et al.

Generally, the weighting of the "non-local means" type is based on the hypothesis that two similar pixels (or voxels) have similar neighbourhoods, whatever the "physical" distance which separates them within the image.

As shown by formula (10) of annex A, the weighting is defined by the sum of the products of intensities $u(x_j)$ multiplied by weighting coefficients $w(x_i, x_j)$.

The weighting coefficients are calculated on the basis of the square of the differences of the intensities of the pixels involved, as represented with formula (11) of annex A.

Once all the pixels have been considered, the weighted value is defined.

The problem with this type of weighting is that it is not suitable for taking into account noise of the "speckle" type.

The Applicant has observed that a Bayesian formulation of the "non-local means" weighting applied to the speckle noise model mentioned above may be expressed using the formula of the equation (20) of annex A.

The Applicant subsequently used a noise model represented by formula (21) of annex A and demonstrated that this model can be combined with formula (20) in order to establish the weighting formula (30). In the case described here, $\gamma=0.5$ is used.

In the formula (30), the weighting coefficients are calculated on the basis of the squares of the differences of the intensities of the pixels involved modulated by the intensity of each weighting pixel, as represented in formula (31) of annex A.

It appears from a comparison of formula (10) and formula (30) that, contrary to all expectations, they are extremely similar in the sense that it is possible to move from one to the other, replacing formula (11) with formula (31), and vice-versa.

That result is extremely surprising when consideration is given to the differences between those methods. Furthermore, formula (30) retains a calculation cost which is tolerable for applications in real time whilst providing results which are clearly superior to formula (10).

Figure 4:
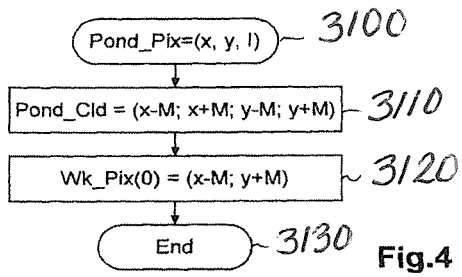
FIGS. 4 to 7 illustrate specific implementations of an operation of FIG. 3.

FIG. 4 illustrates an exemplary implementation of operation 310.

That operation begins at 3100 from a current pixel Pond_Pix which is characterised, as has been seen above, by its coordinates and by the intensity associated therewith.

At 3110, the reduction unit 120 defines the set of working pixels which are going to be considered in the weighting loop of operation 310 by means of a selection rule.

In the example described here, that selection rule defines a square which has a length 2M+1 and which is centred about the pixel Pond_Pix. The number M is one of the parameters of the operation 210. That parameter influences the noise reduction effectiveness because it defines the working window which will be used as a basis for the weighting of the pixel Pond_Pix.

In this manner, the greater M becomes, the higher the calculation cost becomes, since a large number of pixels are taken into consideration for the noise reduction, and the greater the quality thereof.

Work by the Applicant has established that it is not advantageous to take an excessively high number M because of the nature of the speckle noise and the limited improvements beyond a specific value.

In the experiments carried out, M=8 is a value which has provided favourable results. The experiments of the Applicant have shown that optimum operation is obtained with a factor M between four and twelve.

In other embodiments, the selection can be carried out differently, for example, by selecting pixels of the unprocessed image data contained in a circle having a radius selected about the pixel Pond_Pix in place of a square, or by defining a rectangle.

In an application with three-dimensional images, the squares become cubes and the circles become spheres. In a variant, that selection may further comprise preweighting of the values of the intensities of the pixels selected.

In an operation 3120, the first working pixel Wk_Pix (0) is subsequently defined and the operation 310 terminates at 3130.

Figure 5:
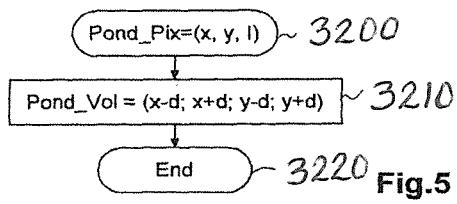

FIG. 5 illustrates an exemplary implementation of the operation 120.

Operation 320 starts at 3200 from the current pixel Pond_Pix which is still characterised by its co-ordinates and its intensity.

At 3210, the selection unit 130 operates and defines a neighbourhood around the pixel Pond_Pix on the basis of a neighbourhood rule.

In the example described here, that neighbourhood rule defines a square which has a length 2a+1 and which is centred about the pixel Pond_Pix. The number a is another of the parameters of the operation 210. That parameter also influences the noise reduction effectiveness because it defines the number of pixels which will be used as a basis for the local weighting of the intensity of the pixel Pond_Pix.

In this manner, the greater the number a becomes, the higher the calculation cost becomes since a large number of pixels is taken into consideration for the weighting.

The work of the Applicant has established that it is not advantageous to take an excessively high number because that amounts to applying substantially the same weighting coefficient to all the pixels of the working window.

In the experiments carried out, d=5 is a value which has provided favourable results. The experiments of the Applicant have demonstrated that optimum operation is obtained with a factor d between 1 and 15. Those experiments have also shown that the optimum value of the factor d depends on the resolution of the image processed.

In other embodiments, the selection can be carried out differently, for example, by selecting pixels of the working window contained in a circle having a radius selected about the pixel Pond_Pix in place of a square, or by defining a rectangle.

The operation 320 subsequently terminates at 3220.

Figure 6:
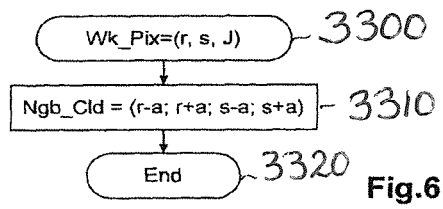

FIG. 6 is a specific implementation of operation 330.

This implementation is similar to the implementation of FIG. 5, with the exception that it starts at 3300 from a current working pixel Wk_Pix among the pixels of the working window and that it defines a neighbourhood of that pixel at 3310 on the basis of the coordinates of the pixel Wk_Pix before terminating at 3320.

In the example described here, the operations 320 and 330 are carried out in an identical manner, that is to say that only the pixel acting as the basis for selection of the neighbourhood is different.

Figure 7:
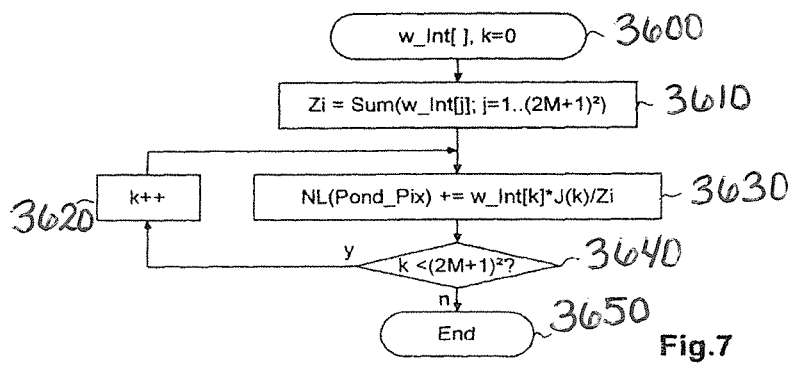

Nevertheless, it would be possible to carry out the operations 320 and 330 in a different manner, with a correspondence being retained between the neighbourhoods arising from those operations. FIG. 7 illustrates an exemplary implementation of operation 360.

The operation 360 starts at 3600 of the weighting table w_Int[ ] which has been established during the weighting loop of operations 330 to 350 of FIG. 3.

In an operation 3610, the weighting unit 140 calculates a normalisation factor Zi which corresponds to the sum of the weightings of the table w_Int[ ]. The normalisation factor Zi serves to ensure that the sum of the values w_Int[k] is equal to 1.

Subsequently, the weighted intensity NL(Pond_Pix) of the current pixel Pond_Pix is defined as the sum of the intensities of each of the working pixels Wk_Pix which are weighted by the weighting value w_Int[Wk_Pix] of each working pixel Wk_Pix normalised by the factor Zi.

That is carried out in a loop, in which a counter k which is incremented at 3620 allows passage through the table w_Int[ ].

At the kth iteration of that loop, the value of the intensity of the current pixel Pond_Pix is increased at 3630 by a quantity corresponding to the product of:
the weighting value w_Int[k] of the kth working pixel Wk_Pix,
multiplied by the value of the intensity J[k] of the kth working pixel Wk_Pix and
normalised by the factor Zi.

A stop condition at 3140 defines the end of the table w_Int[ ], after which the operation 360 ends at 3650.

Once the table w_Int[ ] has been completely passed through, the value NL(Pond_Pix) contains the intensity value which is associated with the pixel Pond_Pix in the enhanced image data 12. As mentioned above, the enhanced image data 12 are transmitted to the imaging device 2 when the set of pixels Pond_Pix of the unprocessed image data 8 have been processed.

FIG. 8 illustrates a variant of the operation of FIG. 2. An object of that variant is to improve the rapidity of the calculations.

In that variant, the image associated with the unprocessed image data 8 is cut into non-empty intersecting blocks which are referred to below as Blk[Pond_Pix[i]].

The blocks are obtained by selecting a subset of pixels of the unprocessed image data 8 which are spaced apart from each other by a selected distance n. Those pixels form the equivalent of the pixels Pond_Pix of FIG. 2. The pixels selected in that manner can be designated Pond_Pix[i], where i is the index of a pixel Pond_Pix among all the selected pixels.

This notation is used because, in this variant, the main loop (operations 820 and 830) does not produce any directly usable data, unlike the variant of FIG. 2, and it is necessary, in order to understand this embodiment, to distinguish between the weighting pixels Pond_Pix.

Subsequently, each block Blk[Pond_Pix[i]] is defined by selecting pixels of the unprocessed image data 8 in a square having a side a and surrounding a pixel Pond_Pix[i], with 2a≥n in order to ensure that the blocks Blk[Pond_Pix[i]] are intersecting. The factor n influences the calculation time in that the higher n becomes, the more the calculation time is reduced, but the more the noise reduction is impaired.

The processing by block starts from the principle that pixels of the same block can be weighted by the same value.

The intersection of the blocks with each other means that some pixels belong to several blocks, which allows a quality weighting to be obtained as will be appreciated below.

This embodiment differs from that of FIG. 2 owing to the implementation of operations 820 and 830 which are different from operations 220 and 230.

In this manner, the operation 820 is modified to produce weighting by blocks, which will be described with FIG. 9.

The operation 830 is modified not to select the next pixel of the unprocessed image data 8 as in operation 230 but to select as the next weighting pixel the centre of the following block Blk[Pond_Pix[i]].

This embodiment also comprises an additional operation 850 after the weighting loop of the operations 820 and 830 and before the enhanced image data 12 are transmitted at 840.

The operation 850 allows consideration to be taken of the fact that some of the pixels of the unprocessed image data 8 are present in several blocks Blk[Pond_Pix[i]].

FIG. 9 illustrates an exemplary implementation of the operation 820 of FIG. 8.

The operations 900, 910, 950 and 970 are similar to the operations 300, 310, 350 and 370 of FIG. 3.

Figure 12:
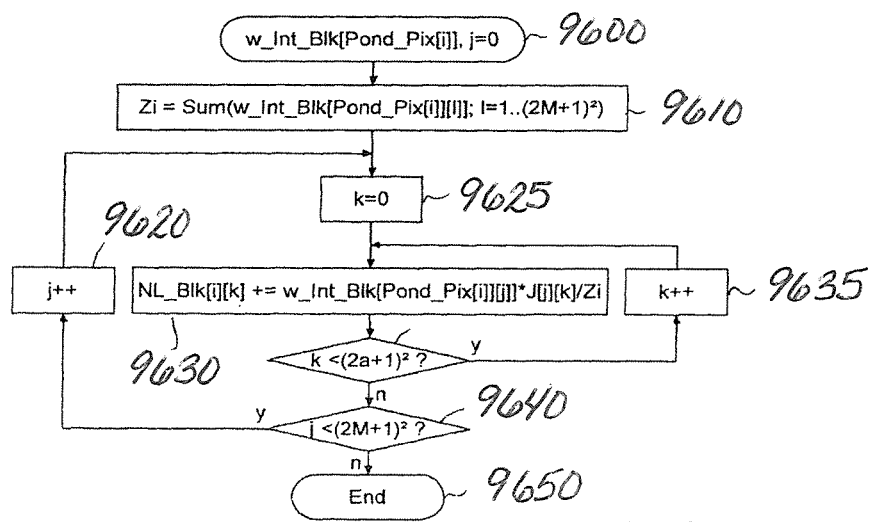

That implementation differs from the operation of FIG. 3 owing to the following operations:

the operation 920 set out with FIG. 10 differs from the operation 320 in that the neighbourhood of the pixel Pond_Pix is replaced by the block Blk[Pond_Pix[i]], the operation 930 set out with FIG. 11 differs from the operation 330 in that the neighbourhood of the working pixel Wk_Pix is replaced by the block Blk[Wk_Pix], the operation 940 differs from the operation 340 in that the weighting is established on the basis of the blocks of the operations 920 and 930 and the operation 960 set out with FIG. 12 differs from the operation 360 in that the intensity value is established on the basis of the weightings of the operation 940.

FIG. 10 illustrates an exemplary implementation of the operation 920.

The operation 920 starts from the pixel Pond_Pix at 9200. In an operation 9210, the block Blk[Pond_Pix[i]] is defined among the pixels selected in operation 910.

The operation 9210 may have the same construction variants as those mentioned for operation 3210, with the number d being replaced by the number a, given that it is necessary to maintain the condition 2a≥n.

The operation 920 subsequently terminates at 9230.

FIG. 11 illustrates an exemplary implementation of the operation 930.

The same observations as those of the operation 330 apply to the operation 930 except that, in this instance, the reference operation is operation 920 and not operation 320.

In this manner, that operation starts at 9300 from a current working pixel Wk_Pix, defines a corresponding block Blk[Wk_Pix] at 9310 and ends at 9320.

As has been mentioned above, there is calculated at 940, on the basis of the block Blk[Pond_Pix[i]] and the blocks Blk[Wk_Pix], a table w_Int_Blk[Pond_Pix[i]] which contains all the weighting values for the working pixels selected in the operation 910.

FIG. 12 illustrates an exemplary implementation of the operation 960.

This operation is very similar to the operation 360 described with FIG. 7 and it differs therefrom mainly in that the operations which compose it are suitable for block processing.

In this manner, the operations 9600, 9610, 9620, 9640 and 9650 are similar to the operations 3600, 3610, 3620, 3640 and 3650 of FIG. 7, respectively, with the exception that they relate to the table w_Int_Blk[ ] in place of the table w_Int[ ].

The operation 3630 is modified to take account of the difference between block processing. This operation is thus replaced by a loop comprising the operations 9625, 9630, 9632 and 9635. As a result, the table of weighted intensities NL_Blk has two dimensions in this instance, that is to say that it has:

an index i which indicates which weighting pixel Pond_Pix[i] was used for weighting, a second index j which indicates the index of each working pixel Wk_Pix in the working window defined in operation 910 and the value stored at the intersection of the indexes i and j corresponds to the weighted value of the intensity of the jth pixel of the block Blk[Pond_Pix[i]].

In specific terms, the loop comprising the operations 9625, 9630, 9632 and 9635 operates similarly to operation 3630, except that it must establish a weighted intensity value for all the pixels of the block Blk[Pond_Pix[i]].

To that end, for a working pixel of index j, it applies the same weighting coefficient w_Int_Blk[Pond_Pix[i] [j]] to each pixel of the corresponding block Wk_Pix.

In that manner, the kth pixel of the block Blk[Pond_Pix[i]] receives for each index j a quantity corresponding to the product of:

the weighting value w_Int_Blk[Pond_Pix[i] [j]] associated with the jth working pixel Wk_Pix, multiplied by the value of the intensity J[j][k] of the kth pixel of the block Blk[Wk_Pix] associated with the jth working pixel and normalised by the factor Zi.

In this manner, when the pixels of the image have been weighted by the processing by blocks, the double index allows retention of an indication of all the weightings for a given pixel of the image contained in a plurality of different blocks.

In that manner, an embodiment of the operation 850 of FIG. 8 may start from table NL_Blk having two dimensions and may define a new table A which stores:

on the one hand, a global index which designates the position of a pixel of the unprocessed image data 8, on the other hand, an n-tuple which contains each of the weighted intensities of the index pixel i in the table NL-Blk having two dimensions.

In that manner, rather than returning one of the weighted intensity values in the enhanced image data 12, the operation 850 may return the mean of the weighted intensities associated with each index i in the table A.

That allows the calculation time to be further reduced.

The formulae 40 to 43 of annex A summarise the calculations carried out in the context of the variant of FIG. 8.

Another method of further accelerating the calculations would be to calculate the weighting coefficients only when they are different from 1 and 0, respectively. That can be carried out by modifying the functions Pond( ) and Pond_Blk( ) in order to establish in accordance with a coefficient µ:

if Mean(I(xk), xk in Blk[Pond_Pix[i]]) Mean(I(xj), xj in Blk[Wk_Pix]) is included in [1/µ; µ], therefore normal calculation;

otherwise weighting coefficient=0 for Blk[Wk_Pix].

Still another method would be to select the pixels as follows:

if |Mean(I(xk), xk in Blk[Pond_Pix[i]])/Mean(I(xj), xj in Blk[Wk_Pix])|<threshold, therefore normal calculation;

otherwise weighting coefficient=0 for Blk[Wk_Pix].

Other optimisation examples will be apparent to the person skilled in the art.

In the above, the selections of pixels in neighbourhoods and/or in blocks can be carried out by combining those elements in "vectors".

That allows a closer conceptual association with the mathematical formulation set out in the formulae of Annex A. However, that is not necessary.

A large number of methods can be used to implement those vectors and it would also be possible to use matrixes.

All the above has been described in a general manner, without taking account of the conditions at the limits, that is to say, for example, the selection of pixels at the edge of an image or a window.

In order to take that into consideration, there are a plurality of solutions which can complement each other or optionally be interchanged:

defining the start pixels and end pixels of the loops so that pixels outside the image/working window are not excluded;

defining the intensity of excluded pixels as being equal to zero;

in the specific case of pixels outside the working window but inside the image, taking those pixels into consideration as if they were part of the working window.

Furthermore, the above description has been given using a factor γ of 0.5 in the noise modelling. In some variants, the factor γ may have a different value, which modifies the formula (31) of annex A as set out with formula (50), in which γ is 1. Furthermore, the formula (31) could also be adapted to be made symmetrical, for example, in accordance with formula (51).

The above description is intended to describe a specific embodiment of the invention. It should not be considered to be limiting or to describe the invention in a limiting manner, and particularly covers any combination of the features of the variants described.

The invention also covers, by way of products, the software elements described which are provided on any medium which can be read by computer. The term "medium which can be read by computer" comprises magnetic, optical and/or electronic media for storing data as well as a transmission medium or vehicle, such as an analogue or digital signal.

ANNEX A $$NL(u)(x_i) = \sum_{x_j \in V_{x_i}} W(x_i, x_j) u(x_j) \tag{10}$$

$$w(x_i, x_j) = \frac{1}{z_i} e^{-\frac{\|u(N_i)-u(N_j)\|_2^2}{h^2}} \tag{11}$$

-continued $$NL(u)(x_i) = \frac{\sum_{x_j \in V_{x_i}} u(x_j) \times p(u(x_i) \mid u(x_j))}{\sum_{x_j \in V_{x_i}} p(u(x_i) \mid u(x_j))} \tag{20}$$

$$u(x) = v(x) + v^\gamma(x)\eta(x) \tag{21}$$

$$w(x_i, x_j) = \frac{1}{z_i} e^{-\frac{d_P(u(N_i)-u(N_j))^2}{h^2}} \tag{30}$$

$$d_P(u(N_i) - u(N_j))^2 = \sum_{p=1}^{p=P} \frac{(u^{(p)}(x_i) - u^{(p)}(x_j))^2}{u^{(p)}(x_j)^{2\gamma}} \tag{31}$$

where:

$V_{x_i}$ is the window of the working pixels used to weight the intensity $u(x_i)$ of a pixel $x_i$, $w(x_i, x_j)$ is the weighting function between pixels $x_i$ and $x_j$, $N_i$ is a neighbourhood of pixels surrounding the pixel $x_i$ having size P and $u(N_i)$ is the vector comprising the intensities $u(x_i)$ of the neighbourhood pixels $N_i$, v( ) is the theoretical value with noise reduction of the intensity u( ) measured, η( ) is a noise function and γ is a modelling factor and h is a filtering factor which controls the filtering intensity.

ANNEX A (continued)

$$NL(u)(B_i) = \sum_{B_j \in V_{x_i}} W(B_i, B_j) u(B_j) \tag{40}$$

$$NL(u)(B_i) = \frac{\sum_{x_j \in V_{x_i}} u(B_j) \times p(u(B_i) \mid u(B_j))}{\sum_{B_j \in V_{x_i}} p(u(B_i) \mid u(B_j))} \tag{41}$$

$$w(B_i, B_j) = \frac{1}{z_i} e^{-\frac{d_P(u(B_i)-u(B_j))^2}{h^2}} \tag{42}$$

$$d_P(u(B_i) - u(B_j))^2 = \sum_{p=1}^{p=P} \frac{(u^{(p)}(B_i) - u^{(p)}(B_j))^2}{u^{(p)}(B_j)^{2\gamma}} \tag{43}$$

$$d_P(u(B_i) - u(B_j))^2 = \sum_{p=1}^{p=P} \frac{(u^{(p)}(B_i) - u^{(p)}(B_j))^2}{u^{(p)}(B_j)^{2\gamma}} \tag{50}$$

$$d_P(u(B_i) - u(B_j))^2 = \sum_{p=1}^{p=P} \frac{(u^{(p)}(B_i) - u^{(p)}(B_j))^2}{\left(\frac{u^{(p)}(B_i)^{2\gamma} + u^{(p)}(B_j)^{2\gamma}}{2}\right)^{2\gamma}} \tag{51}$$

where $B_i$ is a block of pixels having size P whose centre is the pixel $x_i$, and with $u(B_i)$ being the vector comprising the intensities $u(x_i)$ of the pixels of the block $B_i$.

The invention claimed is:

1. An image processing device comprising:
   a storage unit for receiving image data, each image data comprising a pixel identifier and associated intensity data,
   a reduction unit configured to select working pixels around a given pixel on the basis of a reduction rule,
   a neighbourhood selection unit configured to select a neighbourhood of a given pixel on the basis of a neighbourhood rule,
   a weighting unit configured to calculate a weighting value between two neighbourhoods on the basis of distances between the intensity data in said two neighbourhoods and a pilot unit configured to call the reduction unit with pixels to be weighted and for each pixel to be weighted, and further configured to:
  call the neighbourhood selection unit with the pixel to be weighted to define a first neighbourhood and with the associated working pixels to define a plurality of second neighbourhoods,
  repeatedly call the weighting unit with the first neighbourhood and a second neighbourhood from the plurality of second neighbourhoods to obtain, each time, a weighting value for the second neighbourhood,
  multiply each weighting value of the second neighbourhood by the intensity data of the associated working pixel to define, each time, a piece of weighted intensity data of a working pixel,
wherein the weighting unit is further configured to associate the values with a neighbourhood in a vector, and to define a distance d between a first vector u(Ni) and a second vector u(Ni) on the basis of a sum of quotients, wherein
  a numerator of the distance d depends on the square of the difference between values taken from respective columns of the first and second vectors, and
  a denominator of the distance d depends on a quantity which is inversely proportional to a value associated with the respective column of the second vector, and
wherein the distance d raised to the square $d(u(N_i)-u(N_j))^2$ between two vectors $u(N_i)$ and $u(N_j)$ is calculated on the basis of the relationship:

$$d_p(u(N_i) - u(N_j))^2 = \sum_{p=1}^{p=P} \frac{(u^{(p)}(N_i) - u^{(p)}(N_j))^2}{\frac{(u^{(p)}(N_i) - u^{(p)}(N_j))^{2\gamma}}{2}}, \quad (51)$$

where P is the number of columns of the vector u(N), $u^{(p)}$(N) is the index column p of the vector u (N) and where γ is a non-zero coefficient.

2. The image processing device according to claim 1, wherein the pilot unit is further configured to call pixels to be weighted in accordance with a section rule.

3. The image processing device according to claim 2, wherein the pilot unit is further configured to calculate a weighted intensity value for each pixel in the first neighbourhood which is associated with a selected pixel to be weighted, on the basis of the weighting values associated with the pixel to be weighted.

4. The image processing device according to claim 3, wherein the pilot unit is further configured to define the weighted intensity value of a pixel belonging to a plurality of first separate neighbourhoods as the mean of the weighted intensity values associated with that pixel in each of said plurality of separate neighbourhoods.

* * * * *

UNITED STATES PATENT AND TRADEMARK OFFICE
CERTIFICATE OF CORRECTION

PATENT NO. : 8,565,546 B2  
APPLICATION NO. : 12/988794  
DATED : October 22, 2013  
INVENTOR(S) : Pierrick Coupe et al.

Page 1 of 1

It is certified that error appears in the above-identified patent and that said Letters Patent is hereby corrected as shown below:

In the Claims

Column 12, Claim 1, (51)

Delete "
$$d_P\left(u(N_i)-u(N_j)\right)^2 = \sum_{p=1}^{p=P} \frac{\left(u^{(p)}(N_i)-u^{(p)}(N_j)\right)^2}{\left(u^{(p)}(N_i)-u^{(p)}(N_j)\right)^{2\gamma}}, \quad (51)$$
$$2$$
"

Insert --
$$d_P\left(u(N_i)-u(N_j)\right)^2 = \sum_{p=1}^{p=P} \frac{\left(u^{(p)}(N_i)-u^{(p)}(N_j)\right)^2}{\left(u^{(p)}(N_i)+u^{(p)}(N_j)\right)^{2\gamma}}, \quad (51)$$
$$2$$
--

Column 12, Claim 4, line 24    Delete "first"

Signed and Sealed this  
Twenty-third Day of September, 2014

Michelle K. Lee  
*Deputy Director of the United States Patent and Trademark Office*